Nov. 8, 1932.  E. BLOMQUIST  1,887,369
FUSE
Filed Aug. 30, 1930  5 Sheets-Sheet 4

Witness:
William P. Kilroy

Inventor:
Ernst Blomquist
By Brown, Jackson, Boettcher & Dienner
Attys.

Nov. 8, 1932.  E. BLOMQUIST  1,887,369

FUSE

Filed Aug. 30, 1930  5 Sheets-Sheet 5

Inventor:
Ernst Blomquist
By
Attys.

Patented Nov. 8, 1932

1,887,369

UNITED STATES PATENT OFFICE

ERNST BLOMQUIST, OF LOMBARD, ILLINOIS

FUSE

Application filed August 30, 1930. Serial No. 478,883.

This application is a continuation in part of my pending application, Serial No. 366,273, filed May 27, 1929, and relates in general to fuse holders.

In recent years, with the coming into use of higher and higher distribution and transmission voltages and the growing demand for electric service in small communities where electric service was hitherto unavailable, the matter of obtaining a compact and economical distribution center or substation has become a matter of great importance. In my parent application, of which this application is a continuation, I show a substation wherein the various parts are arranged in a compact and efficient manner, one of the features of the station residing in the use of a bath of oil or other insulating liquid for the disconnect switches and the fuses on the high voltage side. This permits the use of smaller switches and smaller fuses than would otherwise be necessary for the same voltage and current of the system. The present invention relates more particularly to the fuse holder and the manner of mounting and removing the same from the oil bath.

The fuse used may be a standard type which comprises a fusible element within a glass tube filled with carbon tetrachloride or other insulating liquid of high arc extinguishing properties, the tube being provided at its opposite ends with metallic ferrules that comprise the fuse terminals. When such a fuse blows under very heavy short circuiting conditions it frequently shatters the glass tube and if it is in the immediate vicinity of grounded or live parts there is a danger of establishing an arc to those parts. This is, of course, an occurrence which must be prevented under all conditions. To prevent this occurrence it has been customary, in the past, to allow a considerable spacing between the fuse and other grounded or live parts such a solution is objectionable where a compact arrangement is desired.

I propose to mount the fuse within a tank of oil or other insulating liquid. This is the same tank wherein the disconnect switches are mounted, said switches being also immersed in the oil bath. Should the fuse blow under the extreme conditions resulting in the shattering of the glass then the oil will effectively prevent the spreading of an arc from the fuse to the other grounded or live parts in the tank. Because of the presence of the oil it is possible to mount the various parts closer together while retaining the same degree of safety heretofore maintained with greater spacing.

I provide a novel form of fuse holder which is removably mounted in the oil bath and is adapted to receive a fuse. Fuses of the kind here used are necessarily mounted in an upright or a substantially upright position. The fuse holder therefore comprises a tube like member which is open at the top for receiving the fuse. Contact ferrules are provided within the tube of insulation so that upon the insertion of a fuse therein an electrical connection is established between the fuse and the ferrules on the inside of the fuse holder. It may happen that the glass of the fuse is shattered upon the blowing thereof under extremely violent conditions. When this occurs the glass will be collected in the outer tube of insulation which must then be removed. Even upon the occurrence of a nonviolent blowing of the fuse, when the glass is not shattered, a vent cap with which the fuse is provided is blown out in order to permit the escape of the gaseous products of the circuit interruption. After a number of such circuit interruptions it is necessary to clean the fuse holder of such foreign matter as may have accumulated. The removal of the fuse holder presents a special problem which must be taken into consideration in the original design of the same. In the first place the fuse holder is completely submerged in the insulating oil or other liquid used. At its best it is objectionable from the point of view of the operator to be required to insert his hand into the oil to manipulate the fuse holder for removing the same. This is in addition to the danger involved in so doing. During the winter months when the oil may reach a temperature of 30° F. below zero, the apparatus being mounted outdoors, it would be impossible to insert the hand into the oil and remove the fuse holder.

To overcome the necessity of inserting the hand into the oil, or even into the oil casing, during the removal or mounting of the fuse, I provide a simple and efficient mounting construction for the fuse holder and a simple tool for manipulating the fuse holder during the process of inserting the fuse holder in the casing or removing it therefrom. This mounting and manipulating tool I consider new. The mounting means comprises a stationary insulator mounted within the tank and having at the top thereof a line terminal which is electrically connected in the desired manner. This terminal is adapted to receive and hold the end of the fuse holder which may be screw threaded thereto. The fuse holder has a contact clip mounted therein at its lower end which contact clip is electrically connected to the terminal upon the mounting of the fuse holder on the insulator support. The contact clip is adapted to receive the lower ferrule of the fuse when the same is inserted into the fuse holder. Means is provided for limiting the extent of turning of the fuse holder as it is threaded into the support whereby the radial location of the clip and other parts of the fuse holder is definitely predetermined.

The upper end of the fuse holder is provided with a contact for establishing a circuit with the upper end of the fuse. Connections are established to this upper contact by means of a removable contact clip which is connected in circuit by means of a flexible braided conductor. Before the fuse holder can be removed from the casing this contact clip must be removed therefrom. The tool or operating rod that is provided for manipulating the fuse receiving tube is also provided with means for manipulating the contact clip thereby obviating the necessity of inserting the hand into the oil for this purpose.

For inserting the fuse into the fuse holder I provide means for gripping the upper one of the fuse ferrules and firmly holding the same, said means constituting a means for establishing a circuit to the upper ferrule. The fuse gripping means may be provided with an insulator having a handle at its opposite end or it may be provided with means whereby an insulated handle may be removably attached thereto. In either event the fuse is firmly gripped and by means of the handle it is lowered into position in the fuse holder.

Another feature of my invention lies in the provision of means for pushing the contact clip into full electrical engagement with the upper contact of the fuse holder upon the insertion of the fuse into position, in the event that it had not previously been fully pushed into position. This means comprises a member projecting from the device that holds the fuse as it is being lowered into position. This projecting member abuts against the top of the contact clip if the same has not been pushed into its fully operative position and upon continued downward movement of the projecting member it forces the contact clip into its full engaging position. This projection also prevents removal of the contact clip from engagement with the upper ferrule of the fuse holder while the fuse is in position. This is of importance in that if the contact clip were removed while the fuse is in position the clip might be called upon to interrupt the line charging current, a function which it is not designed to have.

In order to acquaint those skilled in the art with the manner of construction and operation of a device in accordance with my invention, I shall describe, in connection with the accompanying drawings, a few preferred embodiments thereof illustrating the principles of my invention.

Figure 1:
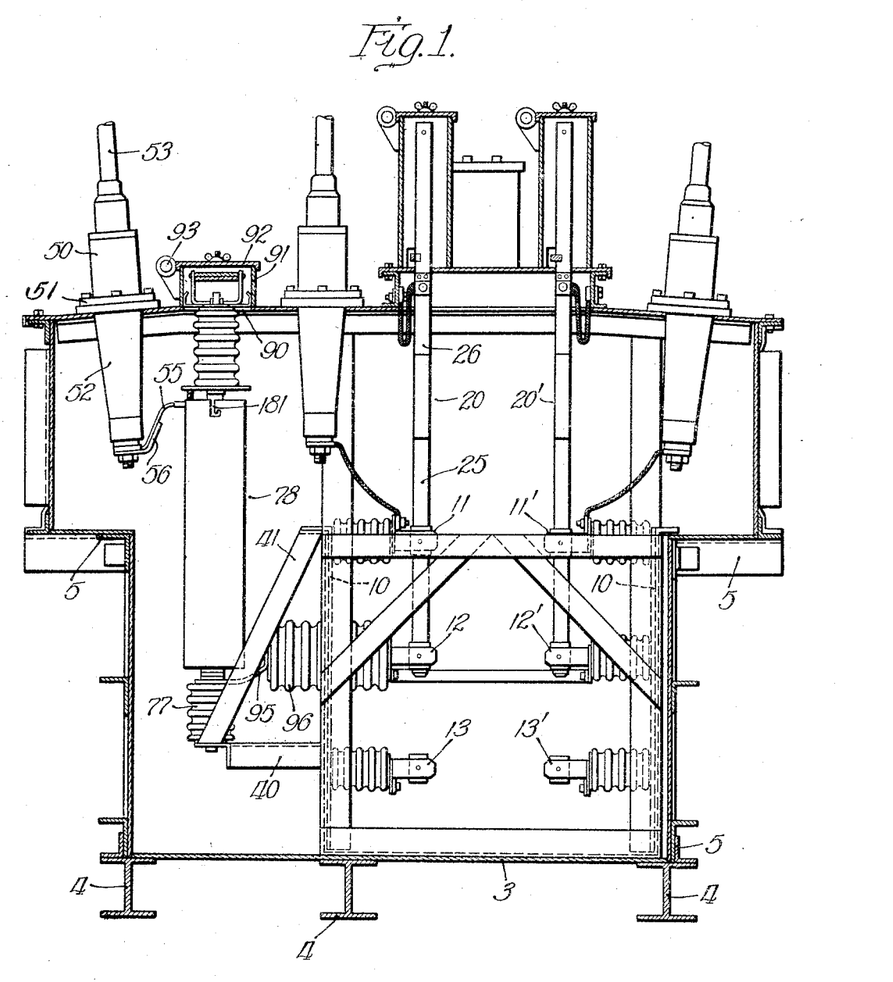
Figure 1 is a sectional view of an oil switching tank within which my improved fuse holder is mounted.

In order to more clearly understand the present invention reference may be had first to Figure 1 showing an oil switching tank within which my improved fuse holder is mounted and showing the manner of mounting the same. The switch tank is indicated by the reference numeral 3 and is supported by suitable I-beams 4—4—4. The tank is made of sheet steel and is suitably reinforced at the corners by means of angle beams 5—5. Horizontal cross bars extending at right angles to the plane of the section of Figure 1 are mounted within the oil tank and support insulating panels 10—10 upon which the switch contacts 11, 12, and 13, and 11', 12' and 13' are mounted. Two switch blades, 20 and 20', cooperate with the contacts for establishing the desired circuit. These switches are of the plunger type and are adapted to be plunged vertically from engagement with the contacts 11—12 to engagement with the contacts 12—13. The switch comprises a strip of micarta or other suitable insulating material which extends the entire length thereof and which has contact strips of copper or other suitable conducting material secured thereto at the opposite sides thereof. One of the contact strips is indicated at 25 and another one of these strips is indicated at 26. When the switch is in the position shown the contact strip 25 establishes a connection between the contacts 11 and 12 whereas the contact strip 26 is not connected in circuit being insulated from the contact strip 25. When the switch 20 is plunged downwardly, the contact 25 establishes an electrical connection between the contact 12 and the contact 13 but it does not connect with the contact 11, which contact is however engaged by the contact strip 26. Since the construction of the switch as well as the circuit connections controlled thereby is shown more fully in my parent application above referred to and since this particular construction constitutes no part of the invention claimed herein it is believed that a further description thereof is not necessary and reference may be had to my above referred application for a further description of the particular construction of the switch and the mounting means therefor as well as the circuit connection controlled thereby.

A lower bracket 40 and an upper bracket 41 are secured to the rear side of the insulating panel 10 and provide a support for an insulator 77 supporting the fuse holder constituting the subject matter of the present invention. The fuse holder is indicated in general by the reference numeral 78.

The conductors extending the circuit to the switching device shown in Figure 1 are extended into the switching tank by means of inverted potheads. The pothead for the phase conductor 53 that is extended to the fuse is indicated by the reference numeral 50. The pothead is secured to the upper portion of the oil tank by means of suitable bolts extending through flanges 51. The portion of the pot head that extends within the casing, as indicated by the reference numeral 52, is the portion of which in the usual use of potheads extends in an upward direction. A lead covered cable 53 extends into the potheads and at the lower end of the pothead a connection is made thereto connecting a flexible lead 55 to the conductor. This connection may be made in any preferred manner. A clip 56 which may be of bar copper or any other desirable material is also secured to the lower end of the pothead for a purpose to be more fully explained hereafter.

The sheet metal cabinet or housing 3 is provided with an opening 90 above each of the fuse holders 78 for permitting the insertion or removal of the fuses from the cabinet. A pipe section 91 is mounted upon the top of the cabinet adjacent each of the openings and there is provided a hinged cover 92 hinged at 93 for permitting access to the fuse holder.

The insulator 77 is provided with a cap which is electrically connected to the lower terminal of the fuse holder in a manner to be more fully set forth as the description proceeds. A conductor 95 extends from this cap to the end of the insulator 96 from whence a connection is extended through the insulator to the terminal clip 12. In the operation of the electric system wherein the switch tank shown in Figure 1 is used, the tank is filled with oil or other suitable liquid having high electrical insulating properties, said tank being filled to a level appreciably above the top of the fuse holder 78.

Figure 2:
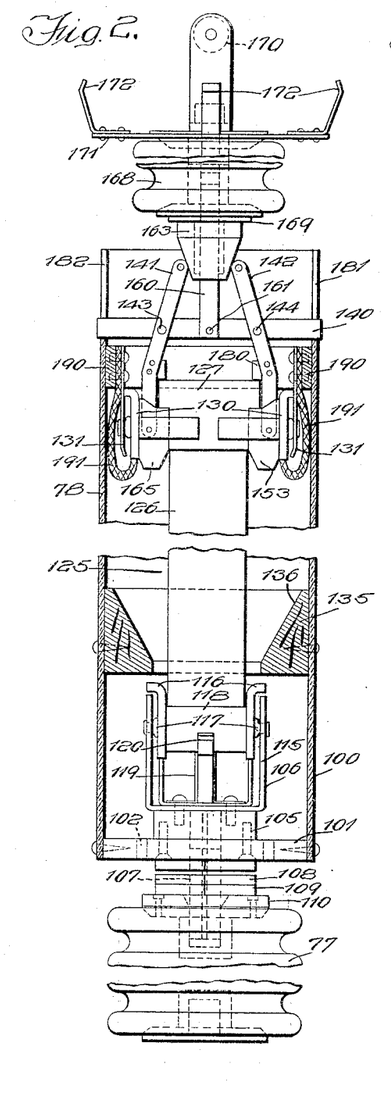
Figure 2 is a longitudinal sectional view of my improved fuse holder with the fuse inserted in place.
Figure 3:
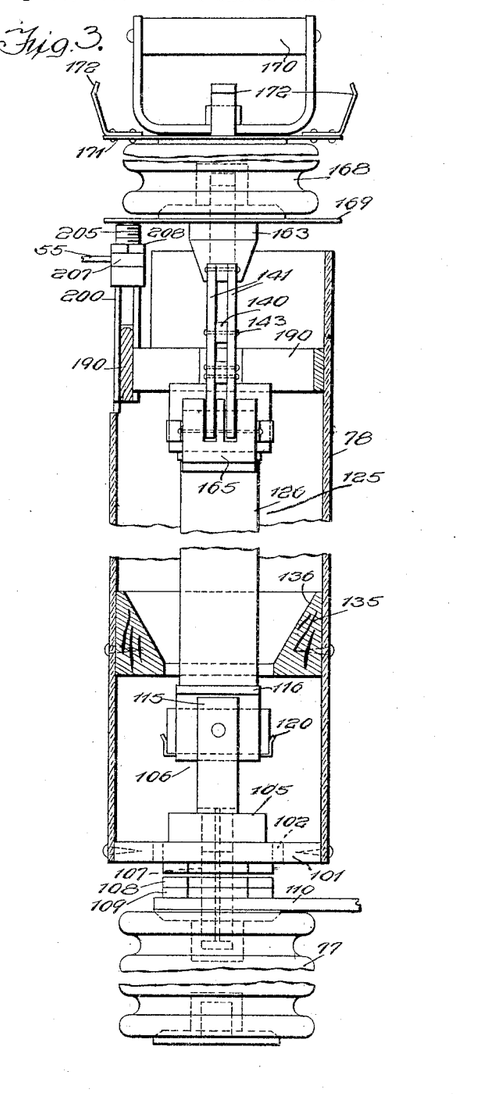
Figure 3 is a longitudinal view through the same fuse holder, said view being taken at right angles to the section of Figure 2.

Reference may now be had to Figures 2 and 3 showing the construction of the fuse holder 78 of Figure 1. The fuse holder comprises a tube 100 of micarta or other suitable insulating material wherein are mounted the contacts for engaging the fuse. A fiber disc 101 is secured to the bottom of the tube 100, said disc being provided with a number of spaced holes 102 therein for permitting the passage of insulating oil from the tank wherein the fuse holder is mounted into the tube 100, and when the tube is being removed from the tank to permit the drainage of the oil from the tube. A block 105 is screwed to the fiber disc 101 on the inside of the tube and supports a suitable contact assembly 106. A threaded spindle 107 is secured to the block 105 and extends outwardly therefrom. A pair of lock nuts 108 and 109 are threaded onto the spindle 107, and the spindle 107 is threaded into the supporting insulator 77.

The lock nuts are tightly locked upon the spindle and are adjusted to such a position as to accurately fix the extent to which the spindle may be turned into the insulator 77. The insulator 77 is provided with a metal cap 110, which extends into the insulator and is cemented therein, said metal cap being internally threaded to receive the spindle 107. The insulator 77 is mounted in the oil bath in the switching tank shown in Figure 1 and more fully described previously.

The contact 106 comprises a U-shaped spring supporting contact member 115 supporting a pair of contacts 116 by means of a swivel support 117 that permits a free swiveling movement of the contacts. The contacts 116 are adapted to receive the ferrule of a Schweitzer & Conrad fuse between them. The ferrule 118 of the fuse is a metallic cylindrical member having flat contacting surfaces on the opposite sides thereof for engagement by the contacts 116. An upstanding lug 119 limits the downward movement of the lower end of the fuse ferrule and a spring member 120 is provided for additionally guiding the lower end of the ferrule. As previously stated the fuse 125 is a standard Schweitzer & Conrad type of fuse although the invention is not limited to such a type of fuse and it is understood that any other form of fuse may be used. The fuse comprises a glass tube encasing the fusible element, said fuse being filled with a suitable arc quenching insulating liquid such as carbon tetrachloride or the like, the fuse element within the tube 126 being connected at the lower end to the metallic ferrule 118 and at the upper end to a metallic ferrule 127, said ferrules constituting the means for establishing a circuit through the fuse.

At the upper end of the tube 100 are mounted a pair of spring pressed contacts 130 each supported by a spring member 131 so as to have freedom of motion to adjust itself into proper engagement with the outside of a chuck member that holds the upper ferrule 127 in a manner to be presently described.

The fuse 125 is mounted in the chuck and is then inserted through the top of the fuse holder 78 until the lower ferrule 118 is engaged by the contacts 116 at which time the chuck will be engaged by the contacts 130 thereby establishing a circuit through the upper ferrule. A ring 135 of suitable insulating material is provided for guiding the end of the lower ferrule 118 into the contacts 116. The ring 135 is in this instance made of suitably treated maple wood and is provided with a conical opening 136 for guiding the ferrule.

Figure 4:
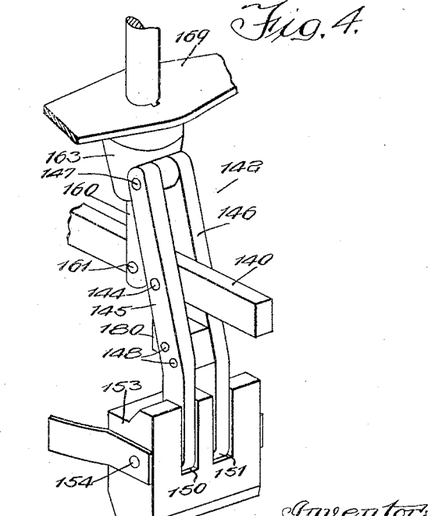
Figure 4 is a fragmentary perspective view of a portion of the chuck mechanism for gripping the upper ferrule of the fuse.

A description will now be given of the chuck for gripping the upper ferrule 127 of the fuse. A bar 140 has a pair of clamping jaws 141 and 142 pivoted to it at 143 and 144 respectively. The jaws 141 and 142 are identical and each comprises a pair of similar members 145 and 146 rigidly secured together in spaced relationship by rivets 147 and 148. The lower ends of the two jaw members 145 and 146 extend into notches 150 and 151 in a contact jaw 153 which may be of brass or any other suitable conducting material.

A pin 154 extends through the contact jaw and pivotally connects the contact jaw with the lower portions of the members 145 and 146. A bolt 160 is slotted at its lower end and pinned to the member 140 by means of a pin 161, a limited amount of angular motion between the members 140 and 160 being permitted. A cone member 163 having a central bore therein is keyed on to the bolt 160 and is freely slidable upon the bolt. It is apparent from Figures 2 and 4 that if the cone member 163 is forced downward, it forces the upper ends of the jaws 141 and 142 apart, thus moving the lower ends of those jaws, that is the ends whereon the contact jaws 153 and 165 are mounted, inward. The upper end of the bolt 160 is screw threaded and extends into an insulator 168 which is provided with a central metallic plate extending therein and internally threaded. As previously stated, the cone 163 is freely slidable along the bolt 160 and therefore as the insulator 168 is turned downwardly upon the bolt, it forces the cone member downward, thereby forcing the upper ends of the arms 141 and 142 outwardly and the lower ends of those arms inwardly. A handle 170 is rigidly secured to the top of the insulator 168, a metallic plate 171 being interposed between the handle 170 and the insulator. The plate 171 has a number of spring metal contacts 172 secured to the top thereof, said metal contacts being provided in order to ground the upper portion of the insulator when the fuse holder is in position within the tank as will be presently described.

When the fuse holder 78 is immersed in the oil tank, the fuse may be inserted into the fuse holder as follows:

With the handle portion 170 and the accompanying insulator and chuck mechanism outside of the switching tank, the handle 170 is turned with respect to the bolt 160 to permit the conical member 163 to be drawn back and thereby permit the upper ends of the chuck jaws 141 and 142 to be drawn together and spread the lower ends of the chuck. A fuse is then inserted between the jaws 153 and 165 so that those last mentioned jaws engage the upper ferrule 127 of the fuse. Stops 180 limit the extent to which the ferrule 127 may be inserted between the jaws. The fuse 125 herein used has a ferrule 127, the end of which is cylindrical and has two beveled portions, on opposite sides, presenting flat surfaces to the jaws 153 and 165. The insulator 168 is then turned about the bolt 160 thus forcing the cone 163 downward between the upper ends of the jaws 141 and 142, thereby forcing the contacts 153 and 165 into a firm engagement with the flat ends of the ferrule 127. The chuck with the fuse 125 firmly held therein is then gripped by the handle 170 and inserted through the open cover 92 (Figure 1) of the oil tank, above the fuse holder, into the fuse holder. The fuse 125 descends into the fuse holder until the lower ferrule 118 is pushed between the spring pressed contact jaws 116 held at the bottom of the fuse holder.

The fuse is now in position in the holder and the cover 92 above the fuse holder may be closed. As previously stated, the lower ferrule 118 is cylindrical and is planed off to provide flat surfaces on the opposite sides thereof for engagement by the contact jaws 116. It is therefore necessary that the fuse be inserted into the holder with the flat surfaces of the fuse disposed in such a position as to engage the contacts 116. To insure the proper disposition of the flat surfaces of the ferrule with respect to the contacts 116 when the fuse is being lowered into the fuse holder, the shell 100 of the fuse holder is provided with two oppositely disposed slots 181 and 182 at the upper end thereof. When the chuck and the fuse held therein are lowered into the fuse holder the bar 140 must pass downward into the slots 181 and 182. When this is done the position of the beveled edges with respect to the shell 100, and therefore with respect to the contacts 116, is fixed thereby accurately locating the angular position of the lower ferrule with respect to those contacts. This is so since the angular position of the fuse with respect to the chuck at the chuck jaws 153 and 165 is accurately fixed due to the flat surfaces of the upper ferrule engaging the chuck jaws.

The contact jaws 153 and 165 are further pressed against the ferrule 127 by the spring pressed contacts 130 mounted within the fuse holder as previously explained.

Figure 5:
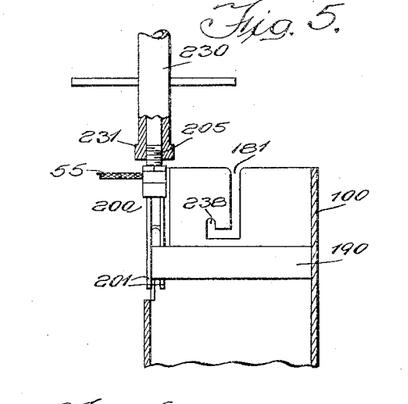
Figure 5 is a fragmentary view showing the manner in which the contact clip is removed from the fuse holder.
Figure 6:
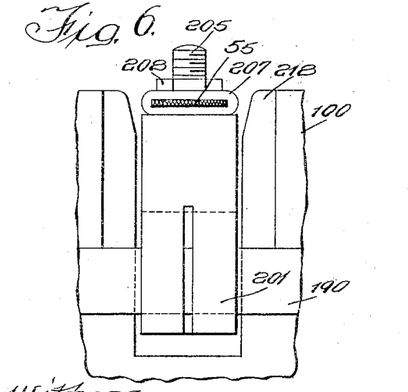
Figure 6 is a fragmentary elevational view taken along the line 6—6 of Figure 7 and showing the manner whereby the contact clip establishes connections with the upper terminal of the fuse holder.
Figure 7:
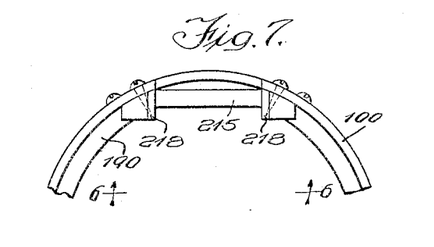
Figure 7 is a fragmentary plan view of a portion of the fuse holder, said view showing the contact ring engaged by the contact clip.
Figure 8:
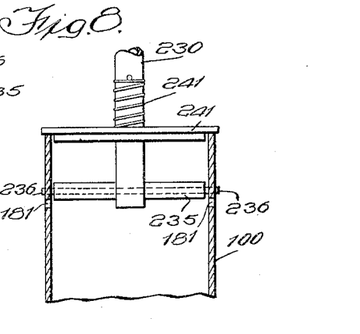
Figure 8 is a view showing the manner whereby the fuse holder is engaged by the gripping tool for removing the fuse holder from the oil tank.

The contacts 130 are connected to a copper ring 190 by means of flexible leads 191. A circuit to the fuse is established by means of a forked clip 200 which is adapted to be pushed into engagement with the ring 190. The clip and the manner in which the same is placed about the contact ring 190 is shown more particularly in Figures 5, 6 and 7. The clip 200 comprises a pair of spring jaws 201, of a construction similar to the jaws of a switch, which are adapted to embrace the contact rings 190. A threaded bolt 205 is secured to the upper end of the clip 201 and constitutes the means for inserting or removing the clip from the contact ring. A flexible copper conductor 55, having a copper tube 207 compressed thereupon, is held upon the top portion of the clip 201 by a nut 208. The flexible conductor 55 is connected to the lower end of the pothead 52 as indicated in Figure 1. The jaws 201 of the clip embrace a flat portion 215 of the ring 190 and thereby establish a good electric circuit between the conductor entering the oil switching tank through the pothead 52 and the fuse held in the fuse holder 78. Guide strips 218 of fiber or other suitable insulating material are secured to the micarta ring or tube 100 and serve to guide the clip 200 into engagement with the contacting portion 215 of the contact ring 190.

Should there be a violent blowing of the fuse 125 such as would break the glass tube 126, it becomes necessary to remove the fuse holder from the oil tank shown in Figure 1 in order to remove the broken glass from the bottom portion of the fuse holder.

Figure 9:
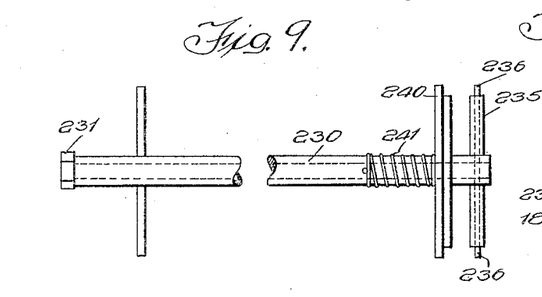
Figure 9 is a view of a tool used for inserting or removing the fuse holder from the oil tank.

The broken glass, as well as the lower ferrule 118, must be removed, of course, from the fuse holder before a new fuse can be inserted into place. To remove the fuse holder from the tank a tool such as shown in Figure 9 is used. This avoids the necessity of reaching down into the oil of the oil tank with the bare hand. To remove the fuse and fuse holder the cover 92 of Figure 1 is opened and the chuck secured to the insulator 168 and as much of the fuse as is held in the chuck is removed by manually gripping the handle 170 and pulling the same outward from the oil tank. The tool 230 of Figure 9 is then inserted into the oil of the tank shown in Figure 1 and the end 231 of that tool, which comprises a standard nut, is threaded onto the bolt 205 in the manner shown in Figure 5. When the nut 231 has been threaded upon the bolt 205 a sufficient amount, the tool 230 is pulled upward thereby withdrawing the clip 200 from the contact ring 190. The clip 200 is then inserted upon the member 56 (Figure 1) at the lower end of the pothead 80. The tool 230 may then be unthreaded from the bolt 205 and withdrawn from the oil tank. The clip 200 is placed upon the member 56 in order to locate it in a definite position for engagement by the nut 231 when the same is to be reinserted in place on the fuse holder after the same has been removed and reinserted. The other end of the tool 230 is then inserted into the oil tank and the cross rod member 235 is inserted into the fuse holder with the ends 236 thereof passing through the slot 181 in the fuse holder.

The slot 181 constitutes one portion of a bayonet joint formed in the fuse holder tube 100 and the member 235 is inserted into this joint until the ends 236 thereof rest in the opening 238. A disc member 240 of maple or other suitable material is mounted upon the tool 230 and is slidable thereon. The spring 241 forces the member 240 into the position shown in Figure 9. As the tool is inserted into the bayonet joint, the member 240 butts the top of the tube 100 and upon further insertion of the tool into the joint the member 240 slides along the tool, placing the spring 241 under compression. The spring 241 thus serves to maintain the rod 235 firmly in place in the joint. With the tool firmly inserted into the joint, the tool is turned thereby turning the tube 100 and with it the spindle 107 and the lock nuts 108 and 109 held thereon. The spindle is thus turned out of the insulator 77 and may then be withdrawn from the oil tank shown in Figure 1 through the open pipe 91. The fuse holder may then be cleaned as desired and may then be reinserted in place in the same manner in which it was removed. Upon inserting the fuse holder in place the holder is turned by means of the tool 230 to thread the bolt or spindle 107 into the insulator 77. The fuse holder is turned until the lock nuts 108 and 109 jam against the member 110.

These lock nuts are adjusted upon the bolt 107 so that this jamming takes place when the portion 215 (Figure 7) of the tube 100 is opposite the member 56 (Figure 1) at the lower end of the pothead. The tool is then removed from the bayonet joint and the other end of the tool is inserted into the oil tank and the nut 231 is threaded upon the bolt 205 of the fuse clip 200 which is now held upon the member 56 in the oil tank. The clip may then be withdrawn from the member 56 and inserted upon the member 215 of the contact ring 190. The tool is then removed from the oil tank and the fuse holder is now in condition to receive a fresh fuse.

A plate member 169 (Figures 2 and 3) is secured to the conical member 163. This plate member has a dual function. When the chuck holding the fuse is inserted into the fuse holder, the plate member 169 butts against the upper portion of the bolt 205 and if the clip 200 has not been fully inserted upon the contacting portion 215 of the ring 190, this plate 169 forces it downward into firm engagement. In addition, this plate prevents the insertion of the tool shown in Figure 9 to engage the clip 200 while the fuse holding chuck is in place.

It is to be noted that to remove the fuse or to insert the same in position the cover 92 must be opened. Suitable interlocks are provided for preventing the opening of the cover while the circuits within the tank are alive. This is fully described in my parent application to which reference may be had. As an additional safety measure it is to be noted that the spring members 172, which may be of bronze or other suitable conducting material, engage the pipe section 91 as may be seen in Figure 1, thereby grounding the upper portion of the fuse holder rendering the manipulation of the fuse perfectly safe.

Figure 10:
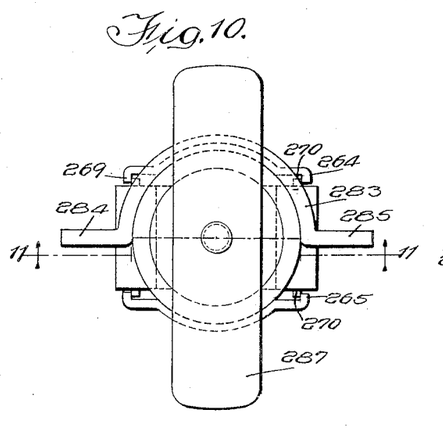
Figure 10 is a top view of a portion of a modified form of fuse holder.
Figures 11, 12, 14:
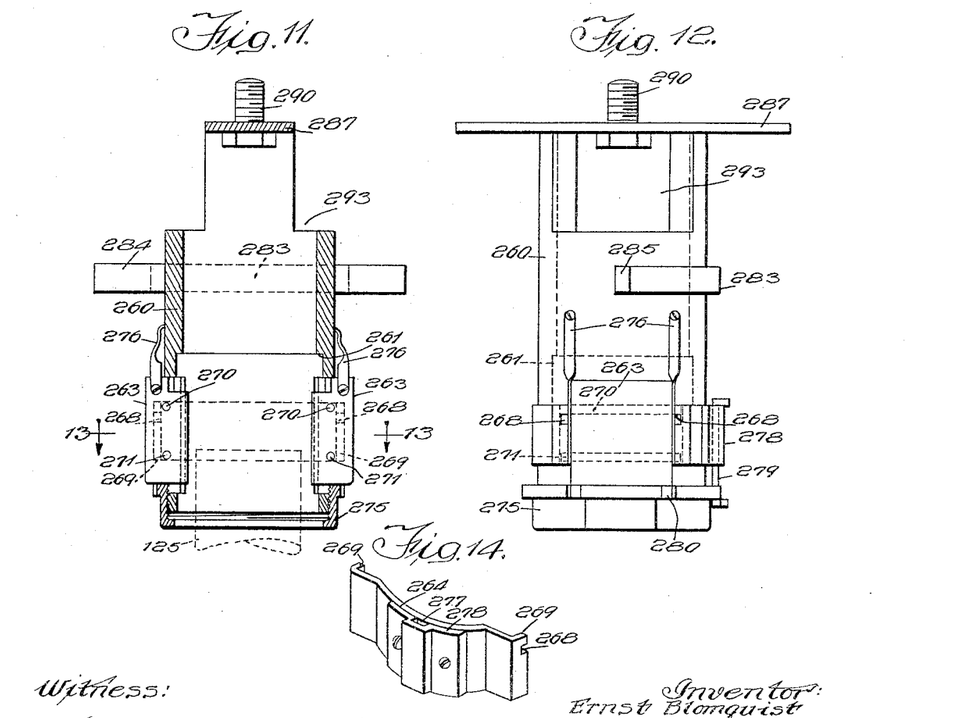
Figure 11 is a sectional view taken along the line 11—11 of Figure 10 and looking in the direction of the arrows.
Figure 12 is a side view of the fuse holder shown in Figure 10.
Figure 14 is a perspective view of a clip used in connection with this form of fuse holder.
Figure 13:
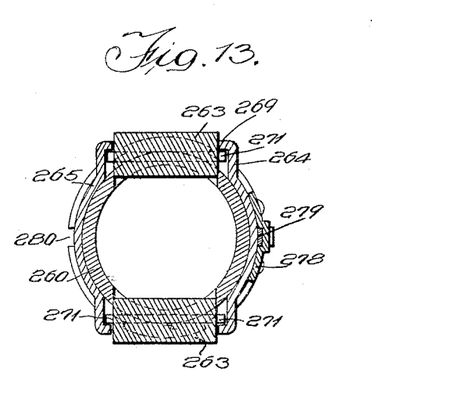
Figure 13 is a sectional view taken along the line 13—13 of the Figure 11 and looking in the direction of the arrows.

An alternative structure for gripping the upper end of the fuse for inserting the same into the fuse holder 78 is shown in Figures 10 to 14 inclusive. This fuse holder comprises a tube 260 of copper or other suitable conducting material bored out at the bottom portion to provide a shoulder as indicated at 261 to receive the upper ferrule of a fuse. Two rectangular holes are formed on opposite sides of the tube 260 at the lower portion thereof for receiving a pair of contact jaws 263 which may be made of brass or any other suitable electrical conducting material. A pair of flat clips 264 and 265 are secured to the tube 260 on opposite sides of the rectangular holes. The clips are bent at 269 and serve to retain the contact jaws 263 within the slots in the lower portion of the tube 260 as will be presently pointed out. A hole or slot 268 is formed in each of the bent in holding portions 269 of the clip 264. The contact jaws 263 each have two pins 270 and 271 extending therethrough. The fuse 125, shown in dotted line in Figure 11, is inserted into the tube 260 until the upper end of the upper ferrule butts against the shoulder 261. The contact jaws 263 are then inserted into the rectangular openings in the tube 260, the upper pins 270 passing through the slots 268 in the members 264 and the lower pins 271 passing below the lower end of the member 264.

When the jaws have been inserted into a position to engage the flat contacting surface of the ferrule the jaws are pushed upward a slight amount so that the pins 270 and 271 assume the position shown in Figure 11. A nut 275 is then threaded onto the lower portion of the tube 260 to support the jaws 263 in an elevated position. The members 264 and 265 prevent the withdrawal of the contact jaws 263 unless the same are first pushed downward so that the pin 270 may pass through the slot 268 and the pin 271 may pass below the member 264. This cannot be done until the nut 275 is turned downward. It may thus be seen that the contact jaws 263 are held against the ferrule of the fuse and the fuse is thereby held against downward removal from the fuse holder. A pair of flexible copper ribbons 276 hold the jaws 263 against misplacement when the jaws are removed from the openings in the tube 260. The ribbons 276 are secured to the tube 260 by suitable screws or the like. A bail 278 is secured to the member 264, and a locking lug 279 is loosely and slidably held in a slot 277 therein. The nut 275 is provided on its outer surface with a number of spaced notches 280 and when the nut is being turned on or off of the tube 260 the lug 279 is pushed upward through the slot so as to be out of the path of motion of the nut. When the nut has been screwed into position it is turned around so that one of the notches 280 is immediately beneath the member 279, and the member 279 is then allowed to drop down through the notch 280 thereby holding the nut 275 against turning.

To remove the nut 275 the lug 279 is raised out of the notch, thereby permitting the turning of the nut 275. A metal member 283 having projecting arms 284 and 285 is secured to the tube 260. When the fuse held in the member shown in Figures 10 and 11 is inserted into the tubular holder 100 of Figure 2 the arms 284 and 285 pass through the slots 181—182 for locating the angular position of the fuse within the fuse holder as was previously pointed out. A plate like member 287 is brazed or otherwise suitably secured to the top of the tube 260 and serves the purpose of the member 169 in the mechanism shown in Figures 2 and 3. In addition a screw 290 is secured to the member 287, said screw being adapted to thread into an insulator such as the insulator 168 of Figures 2 and 3 which insulator supports a handle portion such as is shown in Figures 2 and 3. A handle such as shown in Figures 2 and 3 is threaded onto the screw 290 and the fuse held in the holder 260 may then be inserted into the tube 100 of Figures 2 and 3 in the same manner as was the chuck previously described in connection with those figures. Under these conditions the spring pressed contact jaws 130 shown in Figures 2 and 3 press against the contact jaws 263 to establish a circuit between the ferrule of the fuse and the clip 200. Rectangular openings 293 are formed on opposite sides of the top portion of the tube 260 in order to permit the free escape of gases that may be formed upon the explosion of the fuse and also to provide for access to the screw 290.

In connection with the holder shown in Figures 10 to 14 inclusive, it is to be noted that if desired a single removable handle, such as the handle shown in Figures 2 and 3, may be used in conjunction with a number of such fuse holders, the handle being unscrewed from the screw 290 when the fuse has been inserted into place. The handle, of course, would include the insulator 168 of Figure 2 and the portions of the apparatus above that insulator. It is of course understood that if desired individual handles may be provided for each of the fuse holders.

The fuses here used are Schweitzer & Conrad fuses as previously stated, although the invention is not limited to the use of fuses of any particular design. The upper ferrule of the fuses is provided with an explosion cap at the upper end thereof, which cap may be blown outward during the blowing of the fuse. In connection with the fuse holder it must be noted that the shoulder 261 in the tube 260 is of such a size as not to interfere with the upward movement of the explosion cap when the same is blown outwardly. In this respect the fuse holder shown in Figures 10 to 14 is preferable to the one shown in Figures 2 and 3 for in the fuse holder shown in Figures 2 and 3 the member 140 may interfere with the free expulsion of the fuse cap.

Figure 15:
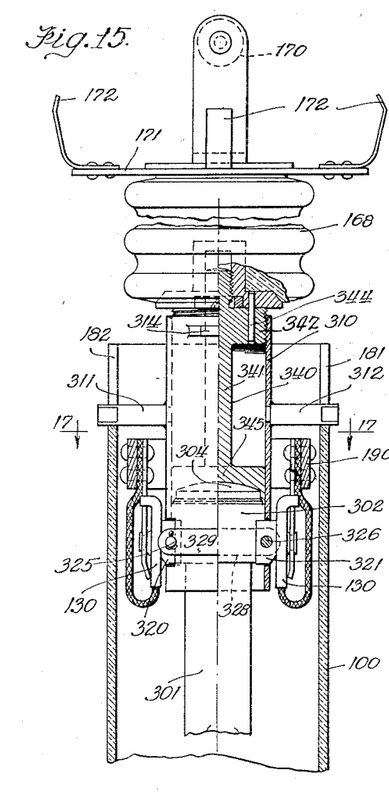
Figure 15 is a fragmentary partial sectional view of a modified form of fuse holder, said view showing the upper portion of the holder with a fuse inserted in position.
Figure 16:
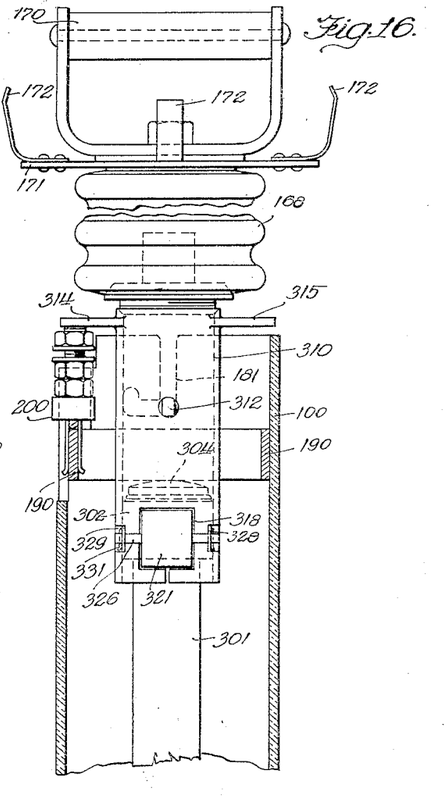
Figure 16 is a fragmentary sectional view of the fuse holder shown in Figure 15, said view being taken at right angles to the section of Figure 16.
Figure 17:
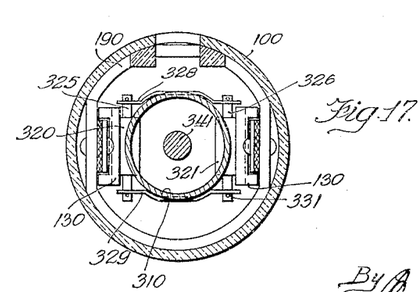
Figure 17 is a sectional view taken along the line 17—17 of Figure 15.

Reference may now be had more particularly to Figures 15 and 16 wherein I show a fuse holder adapted to hold a somewhat specifically different type of S and C fuse. This type of fuse holder is particularly adapted for use in connection with fuses wherein the vent cap that is adapted to be blown when the fuse interrupts an exceptionally heavy short circuit extends to substantially the periphery of the top portion of the fuse. The glass fuse is indicated at 301 and is provided, at its top, with a ferrule 302 similar to the ferrule 127 of the fuse previously described. This last mentioned ferrule includes a vent cap 304 which is adapted to blow when the fuse is blown by an exceedingly heavy short circuit. This cap extends clear to the periphery of the ferrule, or so near to the periphery thereof that for the purposes of my fuse holder it may be so considered.

The fuse holder proper includes the tube 100, which is of a construction substantially identical to the tube shown in Figures 2 and 3 and is mounted in substantially the same manner. This tube 100 is provided with a contact ring 190 adapted to receive a contact clip 200, as previously described. The fuse chuck or gripping means comprises a tube 310 which may be made of steel or other suitable material, said tube being provided with two radially outstanding arms 311 and 312 that are adapted to enter the slots 181 and 182 of the tube 100 in the manner previously described. In addition this tubular chuck 310 is provided with a pair of extensions 314 and 315, either one of which is adapted to force the contact clip 200 downward into firm engagement with the contacting portion of the contact ring 190 and to prevent withdrawal of the contact clip as long as the fuse holding chuck is in place.

The fuse holding chuck 310 is provided, adjacent its bottom portion, with two substantially rectangular slots 318—318 into which contact blocks 320 and 321 may be inserted for engagement with the contacting portion of the upper ferrule 302. The contacting blocks 320 and 321 are provided with pins 325 and 326, respectively, said pins extending through the contact blocks and projecting outwardly therefrom at both ends thereof. The fuse is first inserted into the chuck and thereafter the contact blocks 320 and 321 are inserted through the rectangular openings 318 in the tubular member 310 to hold the fuse against downward withdrawal. After this has been done, a pair of clamp links 328 and 329 are inserted over the ends of the pins 325—326 to hold the contact blocks against withdrawal from the slots 318. Cotter pins 331 may be provided for retaining the clamp links 328 and 329 in place.

In order to mount the fuse within the tube 100 I provide a handle structure similar to the handle structure shown in Figures 2 and 3 and mounted upon the insulator 168. This insulator has a spacer member 340 secured thereto. The spacer member includes a stud portion 341 that is threaded at its upper end and threads into a tapped opening in the insulator 168. This spacer member is also provided with an integral flange 342 adjacent the top thereof. The spacer member 340 is adapted to be threaded into the tapped hole in the insulator 168 until the flange 342 engages with the bottom of the insulator. Thereafter a pin 344 is driven through a hole in the flange member 342 and into an aligned hole in the bottom of the insulator 168, thereby serving to prevent turning of the insulator 168 with reference to the spacer member. The flange 342 is externally threaded. A cap member 345 is formed integrally with the spacer member at the bottom thereof and is of a concave shape at the bottom thereof to conform with the shape of the top of the vent cap 304. By turning the handle of the insulator 168, the flange 342 may be threaded into engagement with corresponding thread at the top of the chuck member 310 until the cap portion 345 engages the vent cap 304 of the fuse. This therefore holds the fuse against upward motion within the chuck 310. The handle of the insulator may now be gripped and the fuse lowered into engagement with the lower ferrules in the tube 100 in a manner such as has been previously described in connection with Figure 2.

At that time the outer sides of the contact blocks 320 and 321 will engage the upper spring contact fingers 130 that are permanently connected with the contact ring 190. The fuse is now in position. Before operations can be resumed it is necessary, in this form of my invention, to remove the insulator 168 and with it the spacer 341 and the cap portion 345. This may be done by merely gripping the handle of the insulator and turning the same until the thread on the flange portion 342 threads out of engagement with the thread at the top of the chuck member 310 whereupon the insulator 168, together with the spacer 340, may be raised outside of the switch tank. This is essential in order to permit free blowing of the vent cap 304 in the event of the occurrence of a very great short circuit. It is to be noted that such action is not possible as long as the spacer member 340 is in place within the chuck and it is for this reason that the spacer member must be removed from the chuck. In order to ultimately remove the fuse from the tube 100, it is merely necessary to again lower the spacer member 340 into the chuck 310 and after threading the flange 342 into the chuck 310, the chuck, together with the fuse, may be raised and removed from the tube.

In this form of my invention a single insulator 168, together with its handle structure 170 and its spacer member 340 will suffice for all of the fuses in the switching station.

In compliance with the requirements of the patent statutes, I have herein shown and described a few preferred embodiments of my invention. It is, however, to be understood that the invention is not limited to the precise constructions herein set forth, the same being shown merely for illustrative purposes.

What I consider new and desire to secure by Letters Patent is:

1. A fuse holder comprising a supporting insulated base, a tubular casing removably supported on said base, a fuse clip in said casing for receiving one end of a fuse, a fuse holding member for gripping the other end of the fuse and inserting it into the tubular casing, spring contacts engaging the fuse holding member, and means associated with the casing and with the fuse holding member for fixing the radial position of the member in the casing.

2. A fuse holder comprising a supporting insulated base, a tubular casing removably supported on said base in a predetermined radial position, a fuse clip in said casing for receiving one end of a fuse, a fuse holding member for gripping the other end of the fuse and inserting it into the tubular casing, spring contacts engaging the fuse holding member, means associated with the casing and with the fuse holding member for fixing the radial position of the member in the casing and thereby insuring a proper radial position of the end of the fuse with respect to the fuse clip, and a removable clip for establishing a connection to said spring contact members.

3. A fuse holder comprising a supporting insulated base, a tubular casing removably supported on said base, a fuse clip in said casing for receiving one end of a fuse, a fuse holding member for gripping the other end of the fuse and inserting it into the tubular casing, spring contacts engaging the fuse holding member, means associated with the casing and with the fuse holding member for fixing the radial position of the member in the casing and thereby insuring a proper radial position of the end of the fuse with respect to the fuse clip, a second clip for establishing a connection to the spring contacts and means for forcing the last mentioned clip into position upon the insertion of the fuse holding member into the casing and for preventing the removal of the second clip prior to the removal of the fuse holding member.

4. In an electrical system, a fuse receiving tube of insulation, a stationary support upon which the tube is removably mounted, said tube including an electrical contact receiving member, and means for fixing the radial position of the contact receiving member with reference to the support when the tube is mounted on the support, said support being mounted in a bath of insulating liquid which is adapted to also submerge the tube of insulation.

5. A fuse holder adapted to be immersed in a bath of insulating liquid and comprising a support, a tube of insulation removably mounted on the support and extending upwardly therefrom and arranged to permit the liquid of the bath to substantially fill the same, and means within the tube of insulation for gripping a fuse, said tube being formed adjacent the top thereof for receiving a tool for mounting and removing the tube upon the support while the support is immersed in the bath of liquid.

6. A fuse holder comprising a tube of insulation, yielding contacts mounted at the opposite ends of the tube on the inside thereof for yieldingly gripping the ends of a fuse and establishing a circuit therethrough upon the insertion of a fuse into the tube, and a removable contact clip extending partly into the tube and adapted to extend the circuit to the upper yielding contact.

7. A fuse holder comprising a tubular member adapted to receive a fuse, a contact clip removably mounted on the member for extending circuit connections thereto, a fuse and fuse supporting means adapted to be inserted into the tubular member, and means carried by the fuse supporting means for forcing the clip into position upon the insertion of the fuse holding means into the tubular member.

8. A fuse holder comprising a tubular member adapted to receive a fuse, a contact clip removably mounted on the member for extending circuit connections thereto, a fuse and fuse supporting means adapted to be inserted into the tubular member, and means carried by the fuse supporting means for forcing the clip into position upon the insertion of the fuse holding means into the tubular member, said fuse holding means being removable from the tubular member independently of the contact clip and preventing the removal of the contact clip while the fuse holding means is in position in the tubular member.

9. In combination, a tube of insulating material adapted to be mounted in a bath of insulating liquid and open to the liquid of the bath, contacts in the tube, and a fuse comprising a tube of insulation having a fusible element therein, said fuse being mounted within the first mentioned tube and spaced from the cylindrical wall thereof and having ferrules movable into engagement with at least one of the contacts in the first mentioned tube.

10. In combination, a tube of insulating material adapted to be mounted in a bath of insulating liquid and open to the liquid of the bath, contacts in the tube, a fuse comprising a tube of insulation having a fusible element therein, said fuse being mounted within the first mentioned tube and spaced from the cylindrical wall thereof and having ferrules movable into engagement with at least one of the contacts in the first mentioned tube and means including a removable contact member for establishing an electrical connection to one of the contacts of the outer tube.

11. In combination, a tube of insulating material adapted to be mounted in a bath of insulating liquid and open to the liquid of the bath, contacts in the tube, a fuse comprising a tube of insulation having a fusible element therein, said fuse being mounted within the first mentioned tube and spaced from the cylindrical wall thereof and having ferrules movable into engagement with at least one of the contacts in the first mentioned tube, means including a removable contact member for establishing an electrical connection to one of the contacts of the outer tube, said outer tube being of an appreciably larger inner diameter than the outer diameter of the fuse, and means within the outer tube for guiding the lower fuse ferrule into engagement with its contact.

12. In combination, a tube of insulation adapted to be removably mounted in a bath of insulating liquid, a contact mounted in the tube, a removable contact clip for establishing electrical connections to the contact, said clip being removable to permit removal of the tube from the bath of insulating, an electrical device, and means for inserting the electrical device into the tube and establishing a circuit between the device and the first mentioned contact.

13. In combination, a tube of insulation adapted to be removably mounted in a bath of insulating liquid, a contact mounted in the tube, a removable contact clip for establishing electrical connections to the contact, said clip being removable to permit removal of the tube from the bath of insulating, an electrical device, and means for inserting the electrical device into the tube and establishing a circuit between the device and the first mentioned contact, said means including means for preventing removal of the contact clip while the electrical device is in position in the tube.

14. In combination a fuse, current carrying blocks and holding means therefor for releasably gripping one end of the fuse and constituting a terminal for the fuse, a fuse holder having contact making means therein, said fuse being inserted into the holder with the current carrying blocks in engagement with said contact making means, and means for insuring a proper radial positioning of the fuse upon the insertion thereof into the fuse holder.

15. A fuse holder comprising fuse gripping means adapted to hold a fuse in a predetermined position fixed against radial motion, a tube of insulation into which the fuse is adapted to be inserted by the gripping means, and means carried by the fuse gripping means for insuring a proper angular positioning of the fuse upon the insertion thereof into the tube.

16. In combination, a fuse including a sealed tube containing a fusible member adapted to blow without breaking the seal upon the occurrence of a small overload and to blow and break the seal upon the occurrence of a large overload, a bath of insulating liquid within which the sealed tube is immersed whereby upon the breaking of the seal the liquid of the bath is available to quench the resulting arc, and a second tube of insulation surrounding the sealed tube in spaced relationship thereto and open to the liquid of the bath, said second tube receiving the products of the violent blowing of the fusible element.

17. In combination, a fuse including a sealed tube containing a fusible member adapted to blow without breaking the seal upon the occurrence of a small overload and to blow and break the seal upon the occurrence of a large overload, a bath of insulating liquid within which the fuse is immersed whereby upon the breaking of the seal the liquid of the bath is available to quench the resulting arc, and a second tube of insulation surrounding the fuse in spaced relationship thereto and open to the liquid of the bath, said second tube receiving the products of the violent blowing of the fusible element, said second tube being removably mounted in the bath of insulating liquid.

18. In combination, a fuse including a sealed tube containing a fusible member adapted to blow without breaking the seal upon the occurrence of a small overload and to blow and break the seal upon the occurrence of a large overload, a bath of insulating liquid within which the fuse is immersed whereby upon the breaking of the seal the liquid of the bath is available to quench the resulting arc, a second tube of insulation surrounding the fuse in spaced relationship thereto and open to the liquid of the bath, said second tube receiving the products of the violent blowing of the fusible element, said second tube being removably mounted in the bath of insulating liquid and entirely submerged therein, and tool means for removing the second tube of insulation from the bath without the necessity of inserting the hands in the bath of insulating liquid.

19. A fuse holder comprising a pair of arms pivoted intermediate their ends, contact blocks mounted at one end of each of the arms and means adjacent the other ends of the arms for spreading those ends apart thereby forcing the contact bearing ends of the arms towards one another to grip an object inserted between them.

20. A fuse holder comprising a bar member, a pair of arms pivoted to the bar member intermediate the ends of the arms, contact blocks mounted at one end of each of the arms, and means mounted on the bar member between said arms for spreading the opposite ends of the arms for moving the contact blocks towards each other.

21. A fuse holder comprising a bar member, a pair of arms pivoted to the bar member intermediate the ends of the arms, contact blocks mounted at one end of each of the arms, and means mounted on the bar member between said arms for spreading the opposite ends of the arms for moving the contact blocks towards each other, said bar extending beyond the pivoted arms and constituting guiding means for guiding the fuse holder as it is inserted into place.

22. A fuse holder adapted to grip the ferrule of a fuse having a metallic ferrule at one end, said holder comprising a tube member into which the ferrule of the fuse is adapted to be inserted, means for limiting the extent of insertion of the ferrule, said tube having an opening in the side thereof, and a contact making member removably inserted into the opening and making contact with the ferrule for establishing a circuit thereto.

23. A fuse holder adapted to grip the ferrule of a fuse having a metallic ferrule at one end, said holder comprising a tube member into which the ferrule of the fuse is adapted to be inserted, said tube including means for limiting the extent of insertion of the ferrule, said tube having an opening in the side thereof, a contact making member removably inserted into the opening and making contact with the ferrule for establishing a circuit thereto, and means mounted on the tube for locking the contact making member in position.

24. A fuse holder adapted to grip the ferrule of a fuse having a metallic ferrule at one end, said holder comprising a tube member into which the ferrule of the fuse is adapted to be inserted, means for limiting the extent of insertion of the ferrule, said tube having an opening in the side thereof, a contact making member removably inserted into the opening and making contact with the ferrule for establishing a circuit thereto, and means mounted on the tube for locking the contact making member in position, said tube being open at its end remote from the ferrule for permitting the escape of gaseous products of a circuit interruption.

25. A fuse holder adapted to grip the ferrule of a fuse having a metallic ferrule at one end, said holder comprising a tube member into which the ferrule of the fuse is adapted to be inserted, means for limiting the extent of insertion of the ferrule, said tube having an opening in the side thereof, and a contact making member removably inserted into the opening and making contact with the ferrule for establishing a circuit thereto, said tube being open at its end remote from the ferrule for permitting the escape of gaseous products of a circuit interruption.

26. A fuse holder for gripping a fuse of the kind having a ferrule at its upper end which ferrule is provided with an explosion cap, said fuse holder comprising a tubular member open at the bottom for receiving the fuse ferrule, said tubular member having means therein for limiting the extent of insertion of the ferrule, said means being free of interference with the explosion cap when the same blows.

27. In a tank containing electrical apparatus and a fuse in circuit therewith all immersed in a bath of insulating oil and wherein the fuse is adapted to blow in the oil under predetermined conditions, means for preventing contamination of the tank by the products resulting from the blowing of the fuse in the oil, said means comprising a tube of insulation spaced from and surrounding the fuse to catch the products resulting from the blowing of the fuse, said tube being open to the liquid within the tank whereby this liquid is available for quenching the arc that may form upon blowing of the fuse.

28. A fuse holder comprising a hollow tube having contact clips within the same at its opposite ends, means at one end of the tube for removably mounting the same and establishing electrical connections to the adjacent clip, a separate clip movable into and out of engagement with the fuse holder when the fuse holder is mounted in position and independent of movement of the fuse holder, said separate clip establishing a circuit to the other clip in the fuse holder, and a fuse removably held between the clips in the fuse holder.

29. A device of the character described comprising a tank, a fuse containing member removably mounted therein, an insulated bushing structure through which a lead in conductor extends into the tank, a flexible conductor secured to the end of the lead in conductor, and supporting a terminal clip, said terminal clip being movable into engagement with the fuse containing member when said member is in position, and said clip being removable from engagement with said member to permit removal of said member from the tank.

30. A tank containing an insulating, arc quenching liquid, a fuse support therein, a fuse containing member mounted at one end on said support and substantially entirely immersed in said liquid, and means for extending an electrical connection to the opposite end of the member, said means comprising a flexible conductor having a contact clip secured to the end thereof, said contact clip being otherwise free of mechanical support, and said member including a contacting portion to which the clip may be connected after the fuse containing member has been inserted upon its support, said clip being removable from the fuse containing member independently of movement of the member.

31. A tank containing an insulating, arc quenching liquid, a fuse support therein, a fuse containing member mounted at one end on said support and substantially entirely immersed in said liquid, means for extending an electrical connection to the opposite end of the member, said means comprising a flexible conductor having a contact clip secured to the end thereof, said contact clip being otherwise free of mechanical support, and said member including a contacting portion to which the clip may be connected after the fuse containing member has been inserted upon its support, said clip being removable from the fuse containing member independently of movement of the member, and a support for receiving the clip and holding the same in a predetermined position when it has been removed from the contacting portion on said fuse containing member.

32. A tank containing insulating liquid, a fuse holder removably mounted in said tank and substantially entirely immersed in the liquid, contact clips in said fuse holder, a fuse removably held in said contact clips, said fuse holder being in a substantially vertical position and including means adjacent the top thereof whereby it may be gripped for insertion into the tank or removal therefrom, and means for insuring a predetermined radial positioning of the fuse holder in the tank.

33. A tank containing an insulating arc quenching liquid and a pair of spaced terminals, a fuse holder removably mounted in said tank between said terminals and substantially in and open to the liquid, contact clips within the fuse holder, means electrically connecting the contact clips with the terminals, and a fuse including a sealed tube having contact ferrules, said fuse being removably held within said fuse holder with the ferrules thereof in said clips.

In witness whereof, I hereunto subscribe my name this 28 day of August, 1930.

ERNST BLOMQUIST.